(12) United States Patent
Pischella

(10) Patent No.: US 8,738,017 B2
(45) Date of Patent: May 27, 2014

(54) RADIO RESOURCE MANAGEMENT IN A RADIO TELECOMMUNICATION NETWORK

(75) Inventor: Mylène Pischella, Paris (FR)

(73) Assignee: France Telecom, Paris (FR)

(*) Notice: Subject to any disclaimer, the term of this patent is extended or adjusted under 35 U.S.C. 154(b) by 836 days.

(21) Appl. No.: 12/226,679

(22) PCT Filed: Mar. 9, 2007

(86) PCT No.: PCT/FR2007/050901
§ 371 (c)(1),
(2), (4) Date: Oct. 24, 2008

(87) PCT Pub. No.: WO2007/125229
PCT Pub. Date: Nov. 8, 2007

(65) Prior Publication Data
US 2009/0069025 A1    Mar. 12, 2009

(30) Foreign Application Priority Data

Apr. 26, 2006  (FR) ...................................... 06 03727

(51) Int. Cl.
*H04W 72/00*    (2009.01)

(52) U.S. Cl.
USPC .................... 455/450; 455/452.1; 455/452.2; 370/331; 370/328

(58) Field of Classification Search
USPC ........ 455/403, 422.1, 424, 425, 432.1, 435.1, 455/436–444, 450, 452.1, 452.2, 453, 509, 455/512, 513, 524, 525, 62, 550.1, 552.1, 455/561; 370/310, 328, 329–333, 335, 341, 370/352, 465, 468, 422, 441; 725/95; 375/132
See application file for complete search history.

(56) References Cited

U.S. PATENT DOCUMENTS

| | | | | |
|---|---|---|---|---|
| 5,425,049 A * | 6/1995 | Dent | | 375/132 |
| 5,537,434 A * | 7/1996 | Persson et al. | | 375/134 |
| 5,649,292 A * | 7/1997 | Doner | | 455/447 |
| 6,011,970 A * | 1/2000 | McCarthy | | 455/436 |
| 6,542,747 B1 * | 4/2003 | Syukri | | 455/450 |
| 6,876,857 B1 * | 4/2005 | Nee et al. | | 455/450 |
| 6,968,192 B2 * | 11/2005 | Longoni | | 455/453 |
| 6,999,432 B2 * | 2/2006 | Zhang et al. | | 370/328 |
| 7,248,878 B2 * | 7/2007 | Lu et al. | | 455/450 |
| 7,317,897 B2 * | 1/2008 | Braun et al. | | 455/63.1 |

(Continued)

FOREIGN PATENT DOCUMENTS

| | | |
|---|---|---|
| EP | 1519607 A1 | 3/2005 |
| JP | 2003-348007 | 12/2003 |
| WO | WO 00/35226 | 6/2000 |
| WO | WO 2005/084146 A2 | 9/2005 |

*Primary Examiner* — Mahendra Patel
(74) *Attorney, Agent, or Firm* — Knobbe Martens Olson & Bear LLP

(57) ABSTRACT

A telecommunication network comprises multiple radio cells (13-15) and a data base (12) which is linked to a multiple number of cells and which comprises information relative to the radio resources of each radio cell of the multiple numbers of cells. The data base is managed by a data base management entity (16). Via the first cell, a requesting message (21) is broadcast to the data base management entity requesting information concerning the radio resources of at least a second cell of the multiple numbers of cells. Then, a response message (22) is received from the data base management entity with the requested information. Finally, radio resources are requested from the second cell on the basis of the information received.

14 Claims, 2 Drawing Sheets

(56) References Cited

U.S. PATENT DOCUMENTS

| | | | |
|---|---|---|---|
| 7,376,437 B2* | 5/2008 | Molkdar et al. | 455/522 |
| 7,873,359 B2* | 1/2011 | Lee et al. | 455/437 |
| 2003/0179731 A1 | 9/2003 | Noguchi et al. | |
| 2004/0162081 A1* | 8/2004 | Lu | 455/452.1 |
| 2005/0288032 A1* | 12/2005 | Orellana et al. | 455/452.1 |
| 2008/0032677 A1* | 2/2008 | Catovic et al. | 455/414.1 |
| 2008/0214197 A1* | 9/2008 | Englund et al. | 455/450 |
| 2008/0220792 A1* | 9/2008 | Fischer | 455/452.2 |

* cited by examiner

RADIO RESOURCE MANAGEMENT IN A RADIO TELECOMMUNICATION NETWORK

This application is a national stage entry of International Application No. PCT/FR2007/050901, filed on Mar. 9, 2007, and claims priority to French Application No. 06 03727, filed Apr. 26, 2006, both of which are hereby incorporated by reference as if fully set forth herein in their entireties.

BACKGROUND OF THE INVENTION

The present invention relates to mobile radio telecommunication networks and, more particularly, management of the radio resources to be allocated to terminals in such a network.

Mobile radio telecommunication networks conventionally cover various geographical zones with the aid of various radio cells.

A terminal communicating in a radio communication network has radio resources which are allocated to it in a first cell of the network and on which it can transmit and/or receive data and/or voice. In the case where this terminal is moving, it is possible that the radio resources already allocated in this first cell may not allow this terminal to continue the communication in progress satisfactorily. In this case, new radio resources can be allocated to it in a second cell so as to allow it to communicate again under good conditions. Certain networks guarantee continuity of communication in the event of a change of cells. Such is the case with networks of cellular architecture in particular. In others, the previously established communication is broken and a new communication is established in the second cell, such is the case in certain networks of WiFi type.

Such management of radio resources comprises a step of taking a decision regarding a change of radio resources from the first cell to the second cell.

In certain telecommunication networks, such a decision to change cell is taken at the level of a centralized entity of the network which is responsible for managing a plurality of cells of the network. Such is the case in a telecommunication network based on a protocol of UMTS type (for "Universal Mobile Telecommunication System") defined by the 3GPP standardization body (for "3rd Generation Partnership Project Agreement"). These networks are based on a hierarchized cellular architecture wherein a network entity, or base station, or else NodeB, is responsible for one or more radio cells and a central controller, or RNC (for "Radio Network Controller"), is responsible for one or more NodeB entities. In such an architecture, the radio resources allocated to a terminal in a cell associated with a NodeB, are managed by the central controller which is responsible for this NodeB.

This central controller has, in particular, information relating to the loading of the cells that it manages, as well as information relating to the signals exchanged in these cells between the NodeB entities and the terminals respectively. On the basis of this information, it is then able to take a decision to change cell for a terminal situated in one of the cells that it manages. Thus, in the event of mobility of a terminal that is currently communicating, an intercell transfer decision can be taken by the central controller. Management of the radio resources is in this case a centralized management and makes it possible to take a decision to change cells on the basis of centralized information relating to the various cells managed by the central controller.

But, in other telecommunication networks, management of the radio resources currently on the move is decentralized at the level of each cell. These networks are based on a distributed architecture, in which each cell is responsible for the cell change decisions taken in respect of its terminals.

Such is the case in the networks of WiFi type, based on the IEEE 802.11 protocol (for "Institute of Electrical and Electronics Engineer"). Thus, when a mobile terminal detects that the radio resources which are allocated to it in a cell managed by a first access point, are no longer adapted to its communication, it searches for a second access point which offers it better communication conditions. For example, the terminal determines a power level associated with a signal received from the first access point of the network which manages these communications. Next, when this power attains a relatively low level, the terminal determines power levels associated with signals received from other access points of the network. It is then able to select the second access point for the management of its communications on the basis of these various power levels. Thus, in such a context, management of the radio resources is carried out in a decentralized manner at the level of the cell and more precisely in the example described above, at the level of each of the terminals in the cell.

Generally, when the decision to change cell is taken at the cell level, whether this decision is taken at the level of the terminal itself or else at the level of the access point of the cell, it is not easy to base this decision on information relating to the radio resources in the potential target cell or cells of the change of cell.

A document WO2005084146 proposes to take into account information relating to the radio resources of the neighboring cells so as to decide a transfer of cells for a terminal of the network. More precisely, in the course of such a transfer, provision is in fact made for the base station which serves the current communication of this terminal, that is to say the server base station, to request information regarding service quality QoS (for "Quality Of Service") from the base stations of neighboring cells. These neighboring base stations then respond to this server base station by indicating the requested QoS information. Next, this QoS information is thereafter transmitted to the terminal concerned, the latter taking the final decision regarding the cell transfer.

But, this type of radio resource management exhibits the disadvantage of generating an additional signal traffic whose quantity is directly linked with the quantity of messages exchanged in relation to the QoS information between the server base station and the various neighboring base stations.

Furthermore, the reliability of such a scheme relies on the robustness of the link between the base station of the current cell and the base stations of the potential target cells. Such a characteristic weakens the performance of this scheme under certain conditions of the network.

The present invention does not exhibit the aforesaid drawbacks.

The invention makes it possible in particular to reduce the quantity of messages requested for the consideration, at the level of a cell, of radio resource information relating to other cells of a telecommunication network.

SUMMARY OF THE INVENTION

A first aspect of the present invention proposes a method for managing radio resources in a telecommunication network comprising a plurality of radio cells and a database which is associated with said plurality of cells and which comprises information relating to radio resources of each radio cell of the plurality of cells, this database being managed by a database management entity. The method comprises the following steps at the level of a first cell:

/a/ sending the database management entity a message of information request relating to radio resources of at least one second cell of said plurality of cells;

/b/ receiving from the database management entity a response message indicating said requested information; and /c/ deciding to request radio resources in said second cell on the basis of said information received.

A database is thus advantageously associated with a plurality of cells of a network, and makes it possible to provide a cell of this plurality of cells with information on neighboring cells so that a decision to change cell can be taken in a relevant manner, at the level of said cell.

Thus, the information relating to the radio resources can readily be dispatched to a cell which makes the request therefor, when the latter wishes to determine whether it is desirable for one of the terminals with which it is communicating to use radio resources of another cell of the network. The information received from the database management entity in response to such a request can thereafter be used as input to decisional mobility algorithms, well known to the person skilled in the art, managed in the cell. Provision may optionally be made to simultaneously take into consideration as input to the algorithm, other information, such as measurements performed by the terminal or terminals on various cells.

A decision to change cell of a terminal is taken at the cell level, that is to say at the level of an entity belonging to the cell. Such an entity can be an entity for managing radio resources of the cell or else the terminal for which such a decision to change cell has to be taken.

Specifically, in a first variant, provision may be made for the radio resource management entity of the cell concerned to be responsible for taking the decision to change cell for the terminals which are in communication with it. In this case, the radio resource management entity of the cell can send a request message destined for the database management entity. The latter responds by sending a response message to the radio resource management entity concerned, which, after having taken a decision regarding an optional change of cell, informs the terminal of same.

In a second variant, provision may be made for the responsibility for this decision taking, at the cell level, to be incumbent on the terminal pertinent to this decision. In this case, the information relating to the radio resources can be requested by the radio resource management entity of the cell concerned, received by the radio resource management entity, then transmitted from this radio resource management entity up to this terminal.

Provision may alternatively be made, in the case where the terminal is responsible for the decision to change cell, for it to request this information directly from the database management entity. Next, it receives directly from this database management entity the information requested on the basis of which it can take a decision.

It is noted that steps /a/ to /c/ can be implemented although radio resources are already allocated to the terminal in the first cell. This case corresponds to a cell transfer, or "handover".

Steps /a/ to /c/ can also be implemented although the terminal requests radio resources in the first cell. This case corresponds to a context of admission of a terminal into a cell of the network.

The present scheme can advantageously apply to any type of service, and particularly to telecommunication services based on a packet transmission, according to a protocol of IP type (for "Internet Protocol").

The telecommunication network can offer a set of types of data streams with which respective levels of service quality are associated. The message of information request relating to radio resources can then indicate an item of information relating to a list of cells included in the plurality of cells and at least one type of data stream of said set of types of data streams.

The response message can indicate, for each cell of the list of cells indicated in the corresponding request message and for the type of data stream indicated in the corresponding request message, a response based on a number of radio resources available in said cell and on the service quality level associated with the type of stream indicated in the request message.

In such a context, a database comprises, for each cell of the telecommunication network concerned, and for each type of data stream offered in this network, information relating to the radio resources in the cell concerned which makes it possible to determine whether this cell is capable of ensuring the QoS level associated with this type of data stream.

Provision may be made for the item of information relating to a list of cells to correspond to an identifier of the cell which sends the request message and for the database management entity to determine the list of cells corresponding to the response message on the basis of an association between an identifier of each cell and a list of cells, this association being stored in the database.

In a variant, the item of information relating to a list of cells corresponds to a list of identifiers of cells for which the request message is sent. In this case, the database management entity is able to directly recover the information requested in relation to all the cells listed in the request message.

In an embodiment of the present invention, the response message also indicates, for each cell of the list of cells and for the type of data stream indicated in the corresponding request message, a number of users able to be served in the cell for the type of data stream indicated. Such an indication can be taken into account in a relevant manner in a decisional cell change algorithm.

In an embodiment of the present invention, a cell periodically applies a scheduled allocation of radio resources.

In such a context, the cell sends a database update message destined for the database management entity after each of said radio resource allocations. Next, on receipt of this update message, the database management entity accordingly updates the information stored in the database.

Thus, advantageously, the database is regularly updated, in a relevant manner.

The response message can also indicate, for each cell of the list of cells and for the type of data stream indicated in the corresponding request message, a reliability level which corresponds to the number of request messages which have been received since the last update of the database and which indicate said cell.

Thus, even if there has not yet been any update of the database in relation to changes of cells of certain terminals over to a determined cell, it is possible to take account of potential changes over to this cell. Specifically, here the number of request messages received for this determined cell is taken into account and it is deduced that it is possible that impending modifications may affect the radio resources of this cell, in particular in the case where some at least of these request messages would come out on a change of cell over to this determined cell.

A second aspect of the present invention proposes a radio resource management entity adapted for the implementation of a method according to the first aspect of the present invention.

A third aspect of the present invention proposes a terminal adapted for the implementation of a method according to the first aspect of the present invention.

A fourth aspect of the present invention proposes a database management entity adapted for the implementation of a method according to the first aspect of the present invention.

A fifth aspect of the present invention proposes a telecommunication system comprising a database management entity according to the fourth aspect of the present invention and one from among the group comprising a terminal according to the third aspect of the present invention and a radio resource management entity according to the second aspect of the present invention.

A sixth aspect of the present invention proposes a computer program intended to be installed in a database management entity according to the fourth aspect of the present invention, comprising instructions able to implement the method according to the first aspect of the present invention, during an execution of the program by processing means of the database management entity.

A seventh aspect of the present invention proposes a computer program intended to be installed in a terminal according to the third aspect of the present invention, comprising instructions able to implement the method according to the first aspect of the present invention, during an execution of the program by processing means of the terminal.

An eighth aspect of the present invention proposes a computer program intended to be installed in a radio resource management entity according to the second aspect of the present invention, comprising instructions able to implement the method according to the first aspect of the present invention, during an execution of the program by processing means of the radio resource management entity.

Other aspects, aims and advantages of the invention will become apparent on reading the description of one of its embodiments.

BRIEF DESCRIPTION OF THE DRAWINGS

The invention will also be better understood with the aid of the drawings, wherein.

DESCRIPTION OF PREFERRED EMBODIMENTS

Figure 1:
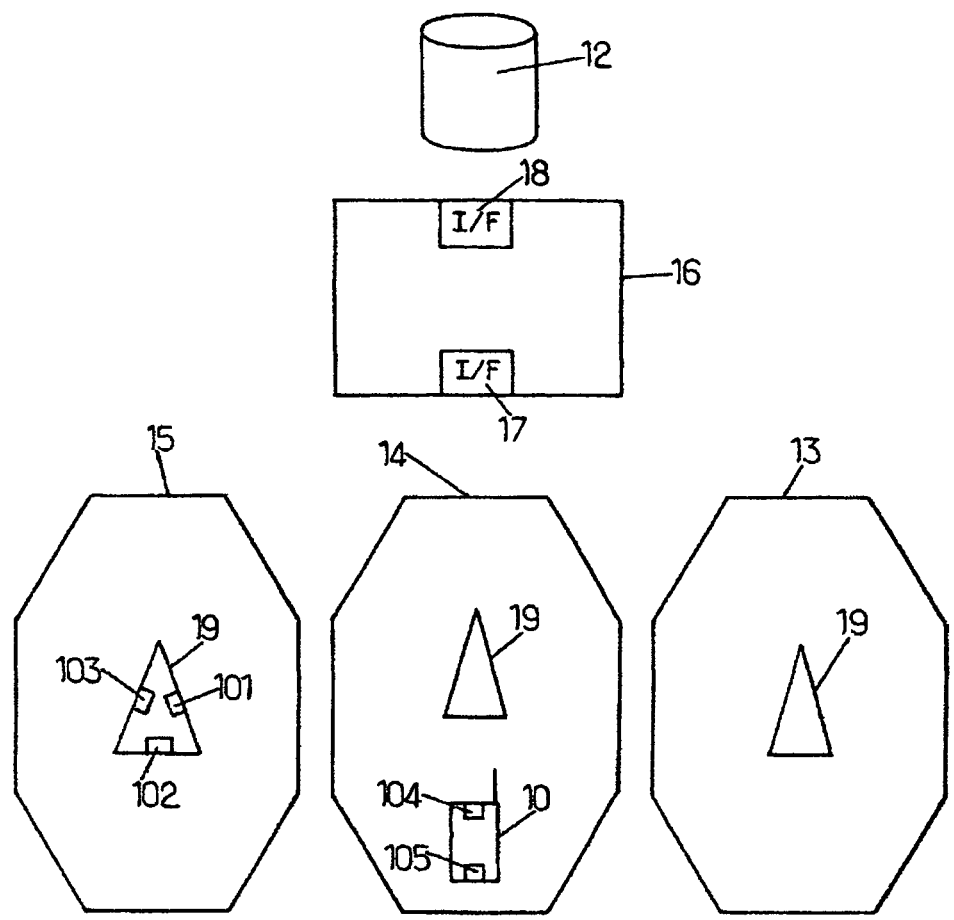
FIG. 1 illustrates a telecommunication network architecture according to an embodiment of the present invention.

FIG. 1 illustrates a decentralized telecommunication network architecture according to an embodiment of the present invention.

Such a telecommunication network comprises a plurality of cells 13-15 with which a database 12 is associated. This database can be managed by a database management entity 16 which comprises:

a first interface unit 17 for interfacing with said plurality of cells, adapted for receiving, from these cells, request messages 21 seeking information relating to radio resources of at least one other cell of this plurality of cells and adapted for sending a response message 22 corresponding to the request message 21; and a second interface unit 18 for interfacing with the database 12, adapted for recovering the information relating to the radio resources requested by a request message 21.

The first interface can receive a message of information request 21 relating to radio resources which indicates an item of information relating to a list of cells and at least one type of data stream.

The second interface can then recover from the database a response for each of these cells and for this type of data stream.

When the item of information relating to a list of cells corresponds to an identifier of the cell which has sent the request message, the database management entity determines the list of cells corresponding to the response message on the basis of an association between an identifier of each cell and a list of cells, this association being stored in the database.

The second interface can also recover from the database a number of users able to be served in said cell for the type of data stream indicated in the request message and in each of the cells of the indicated list.

The first interface can also receive database update messages respectively from the cells of the plurality of cells and the second interface unit can advantageously update the database as a function of information contained in these update messages. The first interface can then send a response message 22 indicating, for the cells and the type of stream indicated in the request message, a reliability level which corresponds to the number of request messages which have been received since the last update of the database and which indicate the cell concerned.

Each radio cell comprises a radio resource management entity 19. Such a radio resource management entity can for example correspond, in the case of WiFi networks, to an access point.

In an embodiment of the present invention, it can comprise:

a send unit 101 adapted for sending the database management entity 16 a message of information request 21 relating to radio resources;

a receive unit 102 adapted for receiving from the database management entity 16 a response message 22 indicating the requested information; and a decision unit 103 adapted for deciding to request radio resources in another cell on the basis of the information received.

Each of these cells 13-15 is responsible for taking the decisions relating to the management of the radio resources, these decisions corresponding in particular to a management of the mobility of terminals which are already in communication in the cell, or else to the admission control of a communication of a terminal in the cell concerned.

These cells are therefore associated with the database 12 which is responsible for providing each of them with the information relating to the radio resources of the other cells.

A user of a terminal 10, who wishes to transmit and/or receive data, requests radio resources in a cell of the network. The communication that the terminal wishes to perform corresponds to a data stream of a certain type of data stream offered in this network.

The terminal 10, in an embodiment of the present invention, comprises:

a receive unit 104 adapted for receiving from the radio resource management entity a response message 22 indicating information relating to the radio resources of a second cell, said information having been requested from the database management entity on the basis of the first cell; and a decision unit 105 adapted for deciding to request radio resources in said second cell on the basis of said information received.

The information requested from the database management entity 16 on the basis of the first cell can, in an embodiment of the present invention, be requested by the terminal by sending a message of information request 21 relating to radio resources of at least the second cell.

Such a telecommunication network offers a plurality of types of data stream, such as for example a data stream of FTP type (for "File Transfer Protocol"), or of HTTP type (for "HyperText Transfer Protocol"), or else a data stream of Voice over IP type, or Voice over IP with silence compression type, or also a data stream of video type, etc. Standardization bodies define various types of data stream which correspond to various types of radio resource allocations.

Thus, for example, in a network of UMTS type (for "Universal Mobile Telecommunication System"), a type of data stream requiring a determined maximum rate, corresponds to a type of allocation of radio resources (or "Radio Bearer"), which can be defined by a fixed number of WCDMA codes (for "Wideband Code Division Multiple Access").

In a telecommunication network of IEEE 802.16e type, various types of data stream are defined such as for example, a type of real-time data stream exhibiting a fixed rate, or else a type of real-time data stream exhibiting a variable rate, or a type of non real-time data stream exhibiting a variable rate, or also a type of "best effort" data stream, or a type of extended real-time data stream with a variable rate.

Generally, with each type of data stream there is associated a Quality of Service (QoS) level which is advantageously taken into account in a decision to change cell according to an embodiment of the present invention.

To attain the QoS level associated with a type of data stream, it is required that the radio resources used during the transmission of this stream meet certain constraints, such as a constraint relating to a latency time, a constraint relating to a fixed or guaranteed rate, a constraint regarding priority with respect to other types of data stream, etc.

Thus, an allocation of radio resources can take into account a QoS level associated with the type of data stream that the terminal wishes to transmit and/or receive while being based advantageously on constraints of the type of those stated above.

Such cell change management thus makes it possible to ensure a QoS level corresponding to the communication desired by a terminal, in a radio telecommunication network managing mobility in a decentralized manner at the cell level. Advantageously, it does not give rise to a significant additional signaling load, since a cell wishing to receive information allowing it to take a relevant decision to change cell receives this information solely from the database management entity, and not from the neighboring cells, as in the prior art.

Figure 2:
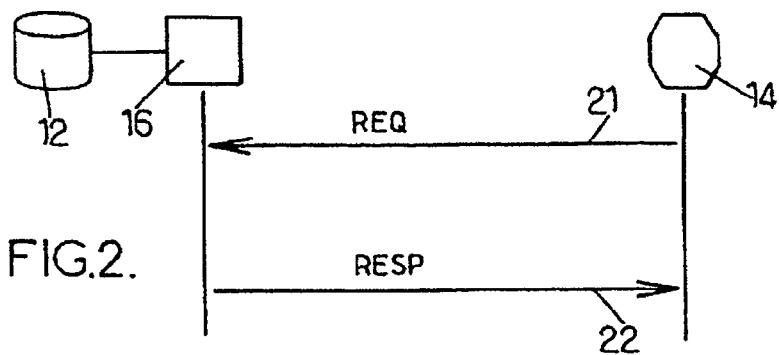
FIG. 2 illustrates an exchange of messages within a telecommunication network according to an embodiment of the present invention.

FIG. 2 illustrates a management of the exchanges between the cell 14 and the database management entity 12 during a request for information. A message of information request 21 relating to the radio resources is sent from the cell 14 destined for the database management entity 12.

This request message 21 can indicate the type of data stream desired by the terminal 10 for its communication, as well as an item of information relating to a list of neighboring cells which may receive its communication.

A terminal can request radio resources for several types of data stream simultaneously, each being associated with different respective levels of quality. Specifically, for example, a terminal can download an FTP file although it is additionally in telephonic communication. A request message can therefore indicate a plurality of types of data stream.

Provision may be made for each cell to know a list of neighboring cells to which a user may make a change of cell. Such a list can either be defined in a static manner by an operator on opening the network, or be obtained in a dynamic manner. In the latter case, it may involve an update of the list defined in a static manner by the operator as a function, in particular for example, of modifications made in the deployment of various radio resource management entities in the network. It is also possible for this list to be generated or updated automatically by virtue of statistical information relating to the various cell transfers which are performed from the cell concerned. In this context, the item of information relating to a cell list indicated in the request message 21 can correspond directly to a list of identifiers of neighboring cells.

Provision may also be made for the list of neighboring cells to be directly associated with the cell 14 in the database 12. Under these conditions, it is no longer necessary to indicate this list in the request message. It suffices that the request message indicate the cell 14 in which the terminal is situated, so that the database management entity is able to deduce therefrom a list of the neighboring cells that can potentially receive the terminal 10. In this case, the item of information relating to the cell list indicated in the request message 21 can simply correspond to an identifier of the cell 14.

The information request message 21 can also indicate a number of users, thus making it possible to make a request grouped over several users.

The sending of this information request message 21 from the cell destined for the database management entity can be triggered in the course of an admission control of the terminal 10 into the cell 14. Specifically, generally, when a terminal 10 asks to be admitted to the network, it sends a request for radio resources in respect of a data stream of a type determined in the cell 14 and that it has selected based on an arbitrary criterion such as, for example, a characteristic relating to the signal received. If this cell 14 cannot provide this terminal with a QoS level associated with this type of data stream, a request for information 21 can then be sent destined for the database management entity to allow the admission of this terminal 10 into a neighboring cell which is able to provide it with the QoS level requested.

When an admission of a terminal is ultimately rejected in the network for a type of data stream, the terminal can again send a request for radio resources indicating another type of data stream associated with a lower QoS level so as to be able to access the network despite everything. An embodiment of the present invention can readily be applied here again.

Such a send of an information request can also be triggered to manage the mobility of the terminal 10 in the cell 14. In this context, the terminal benefits from radio resources which are allocated to it in the cell 14, but a loss of quality in relation to the data stream currently being transmitted is detected. The cell 14 requests information from the database management entity so as to determine whether a neighboring cell is capable of offering better quality to the current communication.

Such a triggering of an information request from the database management entity 12 can be carried out by the terminal itself or else by an entity for managing resources of the cell in which the terminal is situated.

Whatever the type of triggering of the sending of a message requesting information from the database management entity 12, on receipt of this message, the database management entity recovers the information relating to the radio resources of each of the cells of the list concerned and relating to the type of data stream indicated. It transmits this information destined for the cell 14 via a response message 22.

Next, the cell 14 processes the information thus received so as to determine whether one of the neighboring cells is able to allocate radio resources to the terminal 10 that make it possible to attain the QoS level associated with the data stream concerned, this processing possibly being done either at the level of a radio resource management entity of the cell 14, or at the level of the terminal 10 involved itself, or else at the level of any other central entity of the cell.

The database 12 contains, for each cell k, k being an integer lying between 1 and the number $N_{cells}$ of cells of the network and for each type of data stream $f_i$, i being an integer lying between 1 and the number of types of data stream offered in the network $N_{stream}$, information which allows it to provide a response to the request 21 sent from a cell.

The present invention covers any type of response which may be relevant for the cell which has requested information from the database management entity. This response may for example be binary and consist in indicating whether or not, "Yes" or "No", the neighboring cell concerned is capable of responding to the expectations of the terminal 10. Thus, in the case where the number of radio resources available in the cell concerned is sufficient for the type of data stream requested, this response indication corresponds to "Yes", and in the converse case to "NO".

In an embodiment, a response can be weighted. Thus, for example, the response can take into account not only the number of radio resources corresponding to the service quality level associated with the type of stream indicated in the request, but also the total or partial number of radio resources, by type of stream, which are available in the cell concerned.

The response can then correspond to a conditional response such as for example:

"Yes, absolutely", in the case in particular where the number of radio resources available in the cell k is much greater than the number of radio resources requested for the type of data stream $f_i$;

"Yes, except abrupt modification", in the case in particular where the number of radio resources available in the cell k is barely greater than the number of radio resources requested for the type of data stream $f_i$, in this case it might then be feared that, following a fast change of allocation of the radio resources in this cell k, there are no longer enough radio resources for the terminal 10;

"No, except abrupt modification", in the case in particular where the number of radio resources available in the cell k is barely less than the number of radio resources requested for the type of data stream $f_i$; in this case it might then be thought that, following a fast change of allocation of the radio resources in this cell k, there are enough radio resources for the terminal 10;

"No, absolutely not", in the case in particular where the number of radio resources available in the cell k is much less than the number of radio resources requested for the type of data stream $f_i$.

In an embodiment of the present invention, the database 12 also contains for each cell k, for each stream $f_i$, a corresponding number of users $N_{users}$ who can be served, $N_{users}$ being an integer. The database 12 can also comprise a number of users for each of the possible responses, representing the number of users who can be served in the cell with a given response indication value.

It can furthermore also contain an additional item of information which makes it possible to evaluate a degree of reliability of the information in relation to the various types of information contained in the database. Thus, a degree of reliability can be in particular allocated to each of the possible responses. This degree of reliability provides an estimation of the uncertainty in the information with which it is associated. The higher the value of this degree of reliability, the more significant is this uncertainty.

In an embodiment of the present invention, this degree of reliability can be based on a number of request messages 21 received for a cell k since the last update of the database relating thereto. In this case, a response can be associated with this degree of reliability so as to allow for consideration of the risk of modifications of allocation of radio resources in the cell k as a function of the number of information request messages received for this cell k since the last update.

Provision may also be made for this degree of reliability to be based on the information contained in these request messages so as to allow finer evaluation of the risk of possible modifications which weighs on the response indicated in the response message sent from the database management entity. Thus, advantageously, it is possible to take into account the number of radio resources which could potentially be requested if it turned out that all the request messages corresponded to an effective change over to this cell k.

This degree of reliability, in an embodiment of the present invention, is expressed in the form of a Reliability flag, for each cell k, and each type of data stream $f_i$. It is updated when requests are dispatched, by the other network cells associated with the database 12, on the cell k and on the type of data stream $f_i$.

Thus, this flag can be reinitialized to zero at each update of the database relating to the cell k, and can be updated on receipt of each request message received for the cell k at the level of the database 12.

For example, provision may be made, when a request relates to a number m of users, for it to be possible to increase by m the Reliability flag of the cell k for the type of data stream $f_i$. Under these conditions, when a given cell makes a request for information on the cell k and the type of stream $f_i$, it receives in the response message a response, bearing the Reliability flag which exhibits a value m. This given cell deduces therefrom that m terminals might make a change of cell over to cell k with the type of data stream $f_i$, and therefore that radio resources might be allocated to these m terminals, that is to say these radio resources may be pre-empted, before they can be allocated to this given cell.

Consequently, the Reliability flag of cell k, for a type of data stream $f_i$ is an additional item of information which allows a cell to base its decision to change cell on an evaluation of the relevance of the other information contained in the response message.

A response message 22 can therefore comprise, for each cell of the list of cells and for the type of data stream indicated in the response message, the following information:
 a response;
 a number of users; and
 a flag value associated with this information.

Thus, on receipt of such a response message, the cell 14 knows the conditional context in which the neighboring cells are capable of providing the radio resources requested for the terminal 10 and can process this degree of reliability in a probabilistic manner for example. Its value can be taken into account in a decisional algorithm implemented in the cell.

The following table corresponds to an internal structure of the database 12 in an embodiment of the present invention. The database 12 contains information on a set of $N_{cells}$ cells, $N_{cells}$ being an integer. These cells can cover a wider or narrower geographical zone.

In a variant, the information relating to the radio resources of the various cells can be stored in several databases which overlap, so as to limit the size of each database.

| Cell 1 | Stream $f_1$ | Response {Cell 1, Stream $f_1$} | $N_{users}$ {Cell 1, Stream $f_1$} | Reliability {Cell 1, Stream 1} |
|---|---|---|---|---|
| | Stream $f_N$ | Response {Cell 1, Stream $f_N$} | $N_{users}$ {Cell 1, Stream $f_N$} | Reliability Cell 1, Stream $f_N$} |
| Cell $N_{cell}$ | Stream 1 {Cell $N_{cell}$, Stream $f_1$} | Response {Cell $N_{cell}$, Stream $f_1$} | $N_{users}$ {Cell $N_{cell}$, Stream $f_1$} | Reliability {Cell $N_{cell}$, Stream $f_1$} |
| | Stream $N_{stream}$ {Cell $N_{cell}$ Stream $f_N$} | Response {Cell $N_{cell}$, Stream $f_N$} | $N_{users}$ {Cell $N_{cell}$, Stream $f_N$} | Reliability {Cell $N_{cell}$, Stream $f_N$} |

Figure 3:
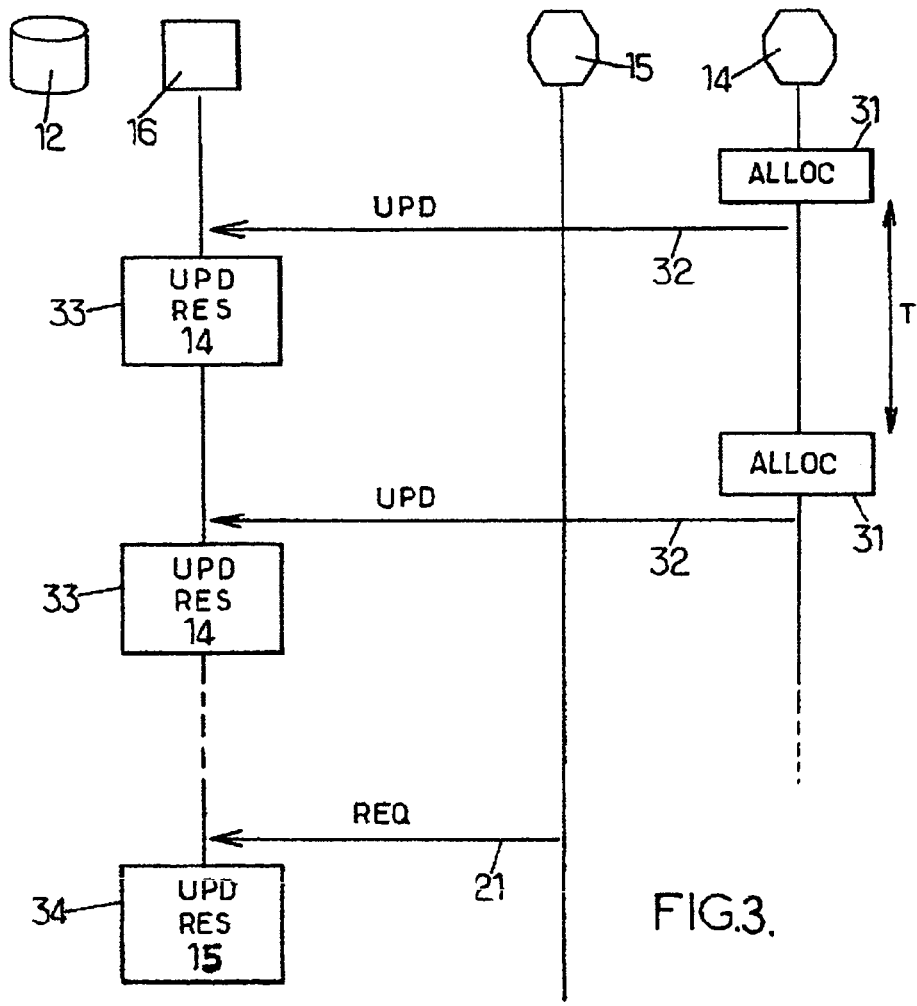
FIG. 3 illustrates a database update according to an embodiment of the present invention.

FIG. 3 illustrates an allocation of radio resources in the cell 14 according to an embodiment of the present invention and the interaction of this allocation of radio resources with database management.

At the level of each cell, a dynamic allocation of the radio resources to the users can be scheduled as a function of the number of users, their various types of data stream, their priorities, etc.

It is possible to provide a first scheduling level 31 corresponding to an adaptation of the allocation of resources in the cell. This scheduling level can be linked with the management of the QoS constraints of the users, the constraints possibly being temporal constraints or load constraints (for example, latency constraint, constraint of lag between two different packets, etc.). Such a scheduling level is aimed at guaranteeing that the constraints associated with the various types of data stream are complied with.

This scheduling level can also correspond to an allocation of radio resources which does not guarantee a QoS level, for a type of data stream. In this case, an adaptation can be performed rapidly, without management of constraints relating to a QoS level of the users.

A second scheduling level can correspond to an adaptation of the radio links as a function of the fast modifications of the radio channels. Such an adaptation can consist in particular in adapting a modulation and a coding at the level of each frame, as a function of the variations in the fast fading.

In an embodiment of the present invention, in the cell 14, periodically, a scheduling of the first level is performed, according to a period T that may be of the order of 100 ms for example. This scheduling consists in determining, for each of the $N_{stream}$ types of data stream, the radio resources $R_{i,1}$, $R_{i,2}$, ..., $R_{i,n}$ allocated globally to the $N_{users.stream\_i}$ that ask to obtain the type of data stream stream_i, where n can depend on the number of users $N_{users.stream\_i}$ as well as characteristics of the type of data stream concerned stream_i. These radio resources can be resources in terms of time, of code, of time and code, of time and frequency, of frequency and code, or else of time, frequency and code.

Next, once these radio resources have been allocated, a scheduling of the second level is performed in the cell 14 so as to adapt the radio link as a function of the fast modifications of the channel. This link adaptation is constrained by the number of resources allocated in the course of the scheduling of the second level.

In such a scheduling context, the cell 14 sends an update message "UPD" 32 pertaining to the database 12 with each implementation of such a scheduling. This scheduling being periodic according to a time period T, the database is updated periodically for the data stored in relation to the radio resources of this cell.

Thus, advantageously, the data stored in the database 12 can follow the variations linked with an admission of new users into a cell, either directly, or following a cell transfer (or "handover"). They can also follow the variations linked with a modification of the type of data stream of the terminal, which may correspond to a modification of the type of stream that the terminal wishes to use, or else to a modification of the type of data stream and which is decided by a scheduling internal to the cell. Such a modification linked with a scheduling can, for example, follow a pre-emption of certain radio resources of the cell by another user.

Additionally, on receipt of each request message 21 received in respect of a list of cells, the respective degrees of reliability associated with these cells are updated in the database 12.

A database 12 according to an embodiment of the present invention offers a flexible and parametrizable structure so that it can provide information relating to the radio resources of the cells which are adapted to any type of decisional algorithm known to the person skilled in the art. Thus, provision may be made for the structure of such a database, as well as its updating, to advantageously be adapted to the decisional algorithm applied in the cell concerned.

Provision may be made such that the various values defined in respect of a response to be indicated in a response message 22 can be interpreted at the level of the cell, the latter deciding, as a function of threshold values inherent to it, whether the value is acceptable for a given type of data stream.

In a variant, provision may be made for the database management entity to translate a response value, stored in absolute value form, into values adapted for the cells when it responds to requests from the latter. Such a variant can be advantageously implemented in the case where the cells 13-15 of the network are provided by different constructors and/or exhibit different respective processings.

The following sections describe the present invention in a network according to a protocol of IEEE 802.16$^e$ type (WiMax network for example), wherein the following five types of data stream are managed:

"Unsolicited Grant Service" (UGS) which is adapted for real-time applications generating data at fixed rate, such as Voice over IP without silence compression;

"Extended Real-Time Variable Rate" (ERT-VR) Service which is adapted for real-time applications which generate variable-rate data on a periodic basis, such as Voice over IP with silence compression;

"Real-Time Variable Rate" (RT-VR) Service which is adapted for real-time applications with variable rates, requiring guaranteed rate and guaranteed lag, such as a transmission of video data of MPEG type;

"Non-Real Time Variable Rate" (NRT-VR) Service which is adapted for applications which require guaranteed rate, but which are not lag sensitive, such as FTP (File Transfer Protocol);

"Best Effort" (BE) Service which is adapted for applications which do not have any constraint on rate or lag.

In such a context, a scheduling for allocating radio resources of the first level can be performed according to the following successive steps:

allocating radio resources for the set of users who request a UGS type of stream, from among the time-frequency intervals which are not allocated by default to other channels, such as pilot channels;

allocating radio resources for the set of users who request an ERT-VR type of stream, from among the time-frequency intervals still available; and allocating radio resources for the set of users who request an RT-VR service, from among the time-frequency intervals still available;

allocating radio resources for the set of users who request an NRT-VR service, from among the time-frequency intervals still available;

allocating resources for the set of users who request a BE service, from among the time-frequency intervals still available.

Such scheduling makes it possible to guarantee a determined QoS level associated with a determined type of data stream.

For example, if, on completion of a scheduling for allocating resources, there are still sufficient time-frequency intervals, meeting required spacing constraints, remaining in the cell 14 to provide a UGS type of stream to two additional users, then the response indicated in the response message for the cell 14, and for the UGS stream, can correspond to "Yes, except abrupt modification"; and the number of users $N_{users}$ can be equal to 2.

When a terminal 10 in the cell 14, neighboring the cell 13, sees the quality of its communication diminish, it can perform measurements on the neighboring cells, while the cell 14 dispatches a request message 21 to the database management entity 12, in relation to the neighboring cells and for the UGS type of data stream.

In the case where, on the one hand, the measurements of the terminal 10 make it possible to conclude that the cell 13 is the best adapted to the request relating to this terminal 10, and, on the other hand, the response message 21 indicates, for the cell 13 and for the UGS type of data stream type, a response corresponding to "Yes, except abrupt modification", a number of users $N_{users}$ equal to 2, and a Reliability flag equal to 0, it may be deduced that the terminal can perform a mobility over to the cell 14, while being assured that the QoS level requested will be provided thereto.

No limitation attaches to a decisional algorithm implemented in an embodiment of the present invention. Specifically, the processing of the information received from the database management entity 12 in the response message 22 is described here only by way of illustration.

The invention claimed is:

1. A method for managing radio resources in a telecommunication network comprising a plurality of radio cells and a database which is associated with said plurality of cells and which comprises information relating to radio resources of each radio cell of the plurality of cells, said database being managed by a database management entity;

said method comprising the following steps:

/a/ sending, from a first cell to the database management entity, a message of information request relating to radio resources of at least one second cell of said plurality of cells;

/b/ receiving in the first cell, from the database management entity, a response message indicating said requested information; and /c/ deciding, in the first cell, to request radio resources in said second cell on the basis of said information received, wherein said response message indicates a reliability level providing an estimation of an uncertainty of said information relating to radio resources;

and wherein said estimation is provided by a set of levels of service quality associated with respective types of data streams of a set of types of data streams, and said response is based on a number of radio resources available in said second cell and on the service quality level associated with a type of stream indicated in the message of information request.

2. The method for managing radio resources as claimed in claim 1, wherein, the telecommunication network offering a set of types of data streams with which respective levels of service quality are associated, the message of information request relating to radio resources indicates an item of information relating to a list of cells included in the plurality of cells and at least one type of data stream of said set of types of data streams; and wherein the response message indicates, for each cell of the list of cells indicated in the corresponding request message and for the type of data stream indicated in the corresponding request message, a response based on a number of radio resources available in said each cell and on the service quality level associated with the type of stream indicated.

3. The method for managing radio resources as claimed in claim 2, wherein the response message indicates, for each cell of the list of cells indicated in the corresponding request message and for the type of data stream indicated in the corresponding request message, a number of users able to be served in said each cell for said type of data stream.

4. The method for managing radio resources as claimed in claim 1, wherein a cell periodically applies a scheduled allocation of radio resources; and wherein said cell sends a database update message destined for the database management entity after each of said scheduled radio resource allocations.

5. The method for managing radio resources as claimed in claim 1, wherein the database is updated in the course of time; and wherein said reliability level corresponds to the number of request messages which have been received since the last update of the database and which indicate said each cell.

6. A radio resource management entity comprised in a first cell of a telecommunication network comprising a plurality of cells associated with a database which comprises information relating to radio resources of each radio cell of the plurality of cells, said database being managed by a database management entity;

said radio resource management entity comprising:

a send unit adapted for sending the database management entity a message of information request relating to radio resources of at least one second cell of said plurality of cells;

a receive unit adapted for receiving from the database management entity a response message indicating said requested information; and a decision unit adapted for deciding to request radio resources in said second cell on the basis of said information received, wherein said response message indicates a reliability level providing an estimation of an uncertainty of said information relating to radio resources;

and wherein said estimation is provided by a set of levels of service quality associated with respective types of data streams of a set of types of data streams, and said response is based on a number of radio resources available in said second cell and on the service quality level associated with a type of stream indicated in the message of information request.

7. A terminal in a first cell included in a telecommunication network comprising a plurality of cells associated with a database which comprises information relating to radio resources of each radio cell of the plurality of cells, said database being managed by a database management entity, each cell being managed by a radio resource management entity; said terminal comprising:
- a receive unit adapted for receiving from the radio resource management entity a response message indicating information relating to the radio resources of a second cell, said information having been requested from the database management entity on the basis of the first cell; and
- a decision unit adapted for deciding to request radio resources in said second cell on the basis of said information received,
- wherein said response message indicates a reliability level providing an estimation of an uncertainty of said information relating to radio resources;
- and wherein said estimation is provided by a set of levels of service quality associated with respective types of data streams of a set of types of data streams, and said response is based on a number of radio resources available in said second cell and on the service quality level associated with a type of stream indicated in the message of information request.

8. The terminal as claimed in claim 7, wherein the information requested from the database management entity on the basis of the first cell is requested by the terminal by sending a message of information request relating to radio resources of at least the second cell of said plurality of cells.

9. A database management entity adapted for managing a database in a telecommunication network comprising a plurality of radio cells and said database; said database being associated with said plurality of cells and comprising information relating to radio resources of each radio cell of the plurality of cells; said database management entity comprising:
- a first interface unit for interfacing with said plurality of cells, adapted for receiving from a first cell of said plurality of cells a message of information request relating to radio resources of at least one second cell of said plurality of cells and adapted for sending to the first cell a response message corresponding to said request message; and
- a second interface unit for interfacing with the database adapted for recovering the information relating to the radio resources requested by a request message,
- wherein said response message indicates a reliability level providing an estimation of an uncertainty of said information relating to radio resources;
- and wherein said estimation is provided by a set of levels of service quality associated with respective types of data streams of a set of types of data streams, and said response is based on a number of radio resources available in said second cell and on the service quality level associated with a type of stream indicated in the message of information request.

10. A telecommunication system comprising:
a database management entity as claimed in claim 9; and
an element chosen from among the group comprising:
a radio resource management entity comprised in a first cell of a telecommunication network comprising a plurality of cells associated with a database which comprises information relating to radio resources of each radio cell of the plurality of cells, said database being managed by a database management entity;
said radio resource management entity comprising:
- a send unit adapted for sending the database management entity a message of information request relating to radio resources of at least one second cell of said plurality of cells;
- a receive unit adapted for receiving from the database management entity a response message indicating said requested information; and
    - a decision unit adapted for deciding to request radio resources in said second cell on the basis of said information received; and
a terminal in said first cell, each cell being managed by a radio resource management entity; said terminal comprising:
    - a receive unit adapted for receiving from the radio resource management entity a response message indicating information relating to the radio resources of a second cell, said information having been requested from the database management entity on the basis of the first cell; and
    - a decision unit adapted for deciding to request radio resources in said second cell on the basis of said information received.

11. A non-transitory computer-readable storage medium storing a computer program intended to be installed in a database management entity adapted for managing a database in a telecommunication network comprising a plurality of radio cells and said database; said database being associated with said plurality of cells and comprising information relating to radio resources of each radio cell of the plurality of cells; said database management entity comprising:
- a first interface unit for interfacing with said plurality of cells, adapted for receiving from a first cell of said plurality of cells a message of information request relating to radio resources of at least one second cell of said plurality of cells and adapted for sending a response message corresponding to said request message; and
- a second interface unit for interfacing with the database adapted for recovering the information relating to the radio resources requested by a request message,
- the computer program comprising instructions able to implement the method as claimed in claim 1, during an execution of the program by processing means of the database management entity.

12. A non-transitory computer-readable storage medium storing a computer program intended to be installed in a terminal in a first cell included in a telecommunication network comprising a plurality of cells associated with a database which comprises information relating to radio resources of each radio cell of the plurality of cells, said database being managed by a database management entity, each cell being managed by a radio resource management entity; said terminal comprising:
- a receive unit adapted for receiving from the radio resource management entity a response message indicating information relating to the radio resources of a second cell, said information having been requested from the database management entity on the basis of the first cell; and
- a decision unit adapted for deciding to request radio resources in said second cell on the basis of said information received,
- the computer program comprising instructions able to implement the method as claimed in claim 1, during an execution of the program by processing means of the terminal.

13. A non-transitory computer-readable storage medium storing a computer program intended to be installed in an entity for managing radio resources in a first cell of a telecommunication network comprising a plurality of cells associated with a database which comprises information relating to radio resources of each radio cell of the plurality of cells, said database being managed by a database management entity;
   said radio resource management entity comprising:
   a send unit adapted for sending the database management entity a message for information request relating to radio resources of at least one second cell of said plurality of cells;
   a receive unit adapted for receiving from the database management entity a response message indicating said requested information; and
   a decision unit adapted for deciding to request radio resources in said second cell on the basis of said information received,
   the computer program comprising instructions able to implement the method as claimed in claim 1, during an execution of the program by processing means of the radio resource management entity.

14. The method for managing radio resources as claimed in claim 5, wherein the response message indicates said reliability level for each cell of the list of cells indicated in the corresponding request message and for a type of data stream indicated in the corresponding request message.

\* \* \* \* \*